US010572996B2

(12) United States Patent
Eurèn

(10) Patent No.: US 10,572,996 B2
(45) Date of Patent: Feb. 25, 2020

(54) METHOD AND SYSTEM FOR DETECTING PATHOLOGICAL ANOMALIES IN A DIGITAL PATHOLOGY IMAGE AND METHOD FOR ANNOTATING A TISSUE SLIDE

(71) Applicant: ContextVision AB, Linköping (SE)

(72) Inventor: Kristian Eurèn, Västerås (SE)

(73) Assignee: CONTEXTVISION AB, Linköping (SE)

( * ) Notice: Subject to any disclaimer, the term of this patent is extended or adjusted under 35 U.S.C. 154(b) by 109 days.

(21) Appl. No.: 15/195,526

(22) Filed: Jun. 28, 2016

(65) Prior Publication Data

US 2017/0372471 A1 Dec. 28, 2017

(51) Int. Cl.

*G06T 7/00* (2017.01)
*G06K 9/00* (2006.01)
*G06K 9/62* (2006.01)

(52) U.S. Cl.

CPC ........ *G06T 7/0012* (2013.01); *G06K 9/00147* (2013.01); *G06K 9/628* (2013.01); *G06K 9/6256* (2013.01); *G06K 2209/05* (2013.01); *G06T 2200/24* (2013.01); *G06T 2207/20132* (2013.01); *G06T 2207/30024* (2013.01); *G06T 2207/30096* (2013.01)

(58) Field of Classification Search

CPC ............... G06T 7/0012; G06T 2200/24; G06T 2207/20132; G06T 2207/30024; G06T 2207/30096; G06K 9/00147; G06K 9/6256; G06K 9/628; G06K 2209/05

See application file for complete search history.

(56) References Cited

U.S. PATENT DOCUMENTS 9,739,783 B1 * 8/2017 Kumar ............. G01N 33/57492
2003/0215936 A1 * 11/2003 Kallioniemi ............. G01N 1/36 435/287.1

(Continued)

FOREIGN PATENT DOCUMENTS

WO WO 00/31534 A1 6/2000

OTHER PUBLICATIONS

Clarke et al. "A novel, automated technology for multiplex biomarker imaging and application to breast cancer." Histopathology 64.2 (2014): 242-255. (Year: 2014).*

Gibbs et al. "Near-infrared fluorescent digital pathology for the automation of disease diagnosis and biomarker assessment." Molecular imaging 14.5 (Jun. 1, 2015): 7290-2015 (Year: 2015).*

(Continued)

*Primary Examiner* — Katrina R Fujita

(74) *Attorney, Agent, or Firm* — Birch, Stewart, Kolasch & Birch, LLP

(57) ABSTRACT

A method for annotating a tissue slide image, a system and a method performed by a computing system for detecting pathological anomalies in a digital pathology image are disclosed. The method performed by a computing system for detecting pathological anomalies in a digital pathology image includes providing a digital pathology image to the computing system and analyzing the digital pathology image using an identification module arranged on the computing system. The identification module uses a machine learning module to execute recognizing an object containing an abnormal image pattern using an identification model loaded in said identification module and identifying whether the abnormal image pattern corresponds to a pathological anomaly using the identification model.

37 Claims, 7 Drawing Sheets

(56) References Cited

U.S. PATENT DOCUMENTS

| | | | | |
|---|---|---|---|---|
| 2009/0161928 | A1 | 6/2009 | Khamene et al. | |
| 2012/0076390 | A1 | 3/2012 | Potts et al. | |
| 2013/0051650 | A1* | 2/2013 | Santamaria-Pang | G16B 40/00 382/133 |
| 2016/0042511 | A1* | 2/2016 | Chukka | G06T 7/0012 382/133 |
| 2016/0266126 | A1* | 9/2016 | Shipitsin | C12Q 1/6886 |
| 2016/0358335 | A1* | 12/2016 | Chukka | G06K 9/00147 |
| 2017/0053398 | A1* | 2/2017 | Mahoor | G06T 7/0012 |
| 2017/0154420 | A1* | 6/2017 | Barnes | G06T 5/003 |
| 2017/0262984 | A1* | 9/2017 | Barnes | G06K 9/00147 |
| 2017/0270346 | A1* | 9/2017 | Ascierto | G06T 7/11 |
| 2017/0270666 | A1* | 9/2017 | Barnes | G16H 50/30 |
| 2017/0294017 | A1* | 10/2017 | Yuan | G06T 7/0012 |

OTHER PUBLICATIONS

Griffin et al. "Stratification of HPV-induced cervical pathology using the virally encoded molecular marker E4 in combination with p16 or MCM." Modern Pathology 28.7 (May 2015): 977. (Year: 2015).*

Isse et al. "Digital transplantation pathology: combining whole slide imaging, multiplex staining and automated image analysis." American Journal of transplantation 12.1 (2012): 27-37. (Year: 2012).*

Stack et al. "Multiplexed immunohistochemistry, imaging, and quantitation: a review, with an assessment of Tyramide signal amplification, multispectral imaging and multiplex analysis." Methods 70.1 (2014): 46-58. (Year: 2014).*

Nakata et al., "Chromogen-based Immunohistochemical Method for Elucidation of the Coexpression of Two Antigens Using Antibodies from the Same Species," Journal of Histochemistry and Cytochemistry, vol. 60, No. 8, 2012, pp. 611-619.

* cited by examiner

METHOD AND SYSTEM FOR DETECTING PATHOLOGICAL ANOMALIES IN A DIGITAL PATHOLOGY IMAGE AND METHOD FOR ANNOTATING A TISSUE SLIDE

TECHNICAL FIELD

The present invention relates to a method performed by a computing system for detecting pathological anomalies in a digital pathology image and a system for detecting pathological anomalies in a digital pathology image. The present invention also relates to a method for annotating a tissue slide image.

BACKGROUND OF THE INVENTION

A common method to detect pathological anomalies, for example infections, inflammations or cancer tumours, is to acquire a tissue sample by using biopsy during which a small sample of tissue is removed from a part of the body. Tissue samples can also come from a resected tissue/tumour to verify or complement the initial diagnose. The removed tissue sample is then processed and cut into thin sections which are stained to visualize structural features of the tissue sample. The most commonly used stain for this purpose is H&E, which is a combination of the two compounds haematoxylin and eosin. An image of the stained tissue sample is then retrieved with a digital camera combined with a microscope and linked to a computer with a monitor for viewing the tissue sample. A pathologist diagnostically interprets the image of the tissue sample by visual examination in order to study manifestations of disease. The pathologist also manually annotates the image by marking assumed pathological anomaly areas, for example cancer areas, which comprise an abnormal image pattern.

Tissue samples contain large numbers of cells and other structures that are widely and unevenly distributed. Thus, interpreting and annotating tissue slides is a highly visual and subjective process which is time consuming, costly, require a trained specialist, and involves the risk for human errors. For example, if a tissue slide is evaluated by several pathologists there is a high risk that they will evaluate the (same) tissue slide differently, resulting in significant variation of the evaluations.

As a consequence, in light of the above drawbacks, there is a need of an improved method and system for detecting pathological anomalies in a digital pathology image and an improved method for annotating a tissue slide image which reduces the risk of errors, are less time consuming and less expensive.

SUMMARY OF THE INVENTION

The subject of the present invention is to eliminate the drawbacks according to prior art.

This subject has been by fulfilled with the method for annotating a tissue slide image, the system and the method performed by a computing system for detecting pathological anomalies in a digital pathology image according to the claims.

More specifically the method performed by a computing system for detecting pathological anomalies in a digital pathology image comprises providing a digital pathology image to the computing system and analyzing the digital pathology image using an identification module arranged on the computing system. The identification module uses a machine learning module to execute recognizing of an object containing an abnormal image pattern using an identification model loaded in said identification module and identifying whether the abnormal image pattern corresponds to a pathological anomaly using the identification model. Thereby, it is possible to automatically detect pathological anomalies in a digital pathology image.

According to a further aspect of the invention, identifying whether the abnormal image pattern corresponds to a pathological anomaly comprises classifying the abnormal image pattern using a classifier in the identification model to classify the abnormal image pattern in accordance with at least two classes and determining whether the abnormal image pattern corresponds to a pathological anomaly based on the classification.

According to another aspect of the invention, the method further comprises providing the identification model using a machine learning algorithm trained on a plurality of annotated digital pathology images.

According to yet another aspect of the invention, providing the identification model comprises generating at least one first image of a tissue slide comprising stained morphological features of the pathological anomaly and annotating the at least one first image using the stained regions. The tissue slide is stained with at least one biomarker and at least one first histochemical dye or at least one biomarker and at least one fluorescence dye or at least one fluorescent biomarker. Thereby, the tissue slide image is objectively and thus correctly annotated. This results in that the method will correctly detect pathological anomalies in a digital pathology image. This will in turn make it possible to better treat the pathological anomaly.

According to an aspect of the invention, providing the identification model comprises providing the annotated images to the machine learning module and training the identification model using different morphological features of the pathological anomalies to obtain the classifier.

According to another aspect of the invention, providing the identification model comprises providing a tissue slide with pathological anomalies; selecting at least one biomarker and at least one first histochemical dye or at least one biomarker and at least one fluorescence dye or at least one fluorescent biomarker, specific for a respective pathological anomaly; staining the tissue slide with the at least one biomarker and the at least one first histochemical dye or the at least one biomarker and the at least one fluorescence dye or the at least one fluorescent biomarker; generating at least one first image of the tissue slide; removing the first histochemical dye from the tissue slide; staining the tissue slide with a second histochemical dye; generating at least one second image of the tissue slide; annotating the at least one second image of the tissue slide; providing the annotated images to the machine learning module and training the identification model using different morphological features of the pathological anomalies to obtain the classifier. Thereby, the image of the tissue slide stained with the second histochemical dye is objectively and thus correctly annotated. This results in that the method will correctly detect pathological anomalies in a digital pathology image of a tissue slide stained with a histochemical dye, for example in an image of a tissue slide stained with H&E. Thereby, it is possible to provide accurate cancer evaluation in digital pathology.

Another advantage is, if the at least one first image of the tissue slide and the at least one second image of the tissue slide are images of a single tissue slide, that it is the same tissue slide that is first stained with at least one biomarker and at least one first histochemical dye or at least one biomarker and at least one fluorescence dye or at least one fluorescent biomarker and later with a second histochemical dye. Thus, it is not different tissue slides, for example adjacent tissue slides (i.e. tissue slides adjacent each other during sectioning of a tissue sample). Thus, the at least one first image and the at least one second image are images of the same tissue slide. Thereby, it is possible to provide higher resolution (compared to if the at least one first image and the at least one second image are images of different tissue slides) and identify expressions of biomarkers (i.e. indicators of a particular biological condition or process) in single cells. This also results in that the method will correctly detect pathological anomalies in a digital pathology image and that it is possible to provide accurate cancer evaluation in digital pathology.

The case is the same if the at least one first image of the tissue slide and the at least one second image of the tissue slide are images of a series of consecutive tissue slides. Each individual tissue slide of the series of consecutive tissue slides is first stained with at least one biomarker and at least one first histochemical dye or at least one biomarker and at least one fluorescence dye or at least one fluorescent biomarker and later with a second histochemical dye. Thus, a first tissue slide is first stained with at least one biomarker and at least one first histochemical dye or at least one biomarker and at least one fluorescence dye or at least one fluorescent biomarker and later with a second histochemical dye, then a second tissue slide is first stained with at least one biomarker and at least one first histochemical dye or at least one biomarker and at least one fluorescence dye or at least one fluorescent biomarker and later with a second histochemical dye, and then the procedure is repeated with the rest of the tissue slides of the series of consecutive tissue slides.

According to yet another aspect of the invention, training the identification model module comprises using clinical outcome. Thereby, it is possible to identify the clinical outcome, for example that the cancer has metastasized, by means of the identification model which analyzes the digital pathology image. This facilitates decisions regarding clinical treatment.

According to a further aspect of the invention, providing a tissue slide comprises selecting a tissue slide from a patient where patient data and/or clinical treatment and/or clinical outcome are known.

According to an aspect of the invention, the at least one fluorescence dye is a fluorescent direct stain.

According to another aspect of the invention, the biomarker is a morphological biomarker and/or a cancer specific biomarker and/or another disease, different from cancer, specific biomarker. Thereby, it is possible for the method to detect different types of cancer and different types of other diseases which are not cancer.

According to yet another aspect of the invention, removing the first histochemical dye from the tissue slide comprises using a detergent or a solvent or a bleach.

According to a further aspect of the invention, the second histochemical dye is selected from a group comprising Haematoxylin, Eosin, van Gieson, Toluidine blue, Silver stain, Periodic acid-Schiff (PAS), Glycogen stain, Weigerts stain, Nissl stain, Golgi stain, Safranin, Oil Red, Prussian blue, Picro-Sirius Red, Mallary's trichome, Steiner Stain, Iron Hematoxylin and Fleugen stain.

According to an aspect of the invention, the method further comprises providing an user interface for inputting a digital pathology image to the computing system and for outputting a display of detected pathological anomalies in the digital pathology image. Thereby it is possible for the user to interact with the computing system.

According to a further aspect of the invention, the pathological anomaly is an infection or an inflammation or a cancer tumor.

According to yet another aspect of the invention, the at least one class is a cancer type and/or a cancer grade and/or a cancer stage. To know the cancer type and/or the cancer grade and/or the cancer stage facilitates decisions regarding clinical treatment.

According to an aspect of the invention, the machine learning module is a deep convolutional neural network. According to another aspect of the invention, the machine learning algorithm is a deep convolutional neural network algorithm.

According to yet another aspect of the invention, the at least one first image of the tissue slide and the at least one second image of the tissue slide are images of a single tissue slide or a series of consecutive tissue slides.

According to a further aspect of the invention, annotating the at least one second image of the tissue slide comprises layering the at least one first image of the tissue slide and the at least one second image of the tissue slide over another and using the stained region of the at least one first image of the tissue slide as mask for cropping the at least one second image of the tissue slide.

More specifically the method for annotating a tissue slide image, comprises providing a tissue slide with pathological anomalies; staining the tissue slide at least one biomarker and at least one first histochemical dye or at least one biomarker and at least one fluorescence dye or at least one fluorescent biomarker, specific for a respective pathological anomaly; generating at least one first image of the tissue slide; removing the first histochemical dye from the tissue slide; staining the tissue slide with a second histochemical dye; generating at least one second image of the tissue slide and annotating the at least one second image of the tissue slide by using a stained region of the at least one first image of the tissue slide. Thereby, the image of the tissue slide stained with a second histochemical dye, for example H&E, is objectively and thus correctly annotated.

Another advantage is, if the at least one first image of the tissue slide and the at least one second image of the tissue slide are images of a single tissue slide, that it is the same tissue slide that is first stained with at least one biomarker and at least one first histochemical dye or at least one biomarker and at least one fluorescence dye or at least one fluorescent biomarker and later with a second histochemical dye. Thus, it is not different tissue slides, for example adjacent tissue slides (i.e. tissue slides adjacent each other during sectioning of a tissue sample). Thus, the at least one first image and the at least one second image are images of the same tissue slide. Thereby, it is possible to provide higher resolution (compared to if the at least one first image and the at least one second image are images of different tissue slides) and identify expressions of biomarkers (i.e. indicators of a particular biological condition or process) in single cells. This also results in that the method will correctly detect pathological anomalies in a digital pathology image and that it is possible to provide accurate cancer evaluation in digital pathology.

The case is the same if the at least one first image of the tissue slide and the at least one second image of the tissue slide are images of a series of consecutive tissue slides. Each individual tissue slide of the series of consecutive tissue slides is first stained with at least one biomarker and at least one first histochemical dye or at least one biomarker and at least one fluorescence dye or at least one fluorescent biomarker and later with a second histochemical dye. Thus, a first tissue slide is first stained with at least one biomarker and at least one first histochemical dye or at least one biomarker and at least one fluorescence dye or at least one fluorescent biomarker and later with a second histochemical dye, then a second tissue slide is first stained with at least one biomarker and at least one first histochemical dye or at least one biomarker and at least one fluorescence dye or at least one fluorescent biomarker and later with a second histochemical dye, and then the procedure is repeated with the rest of the tissue slides of the series of consecutive tissue slides.

According to an aspect of the invention, providing a tissue slide comprises selecting a tissue slide from a patient where patient data and/or clinical treatment and/or clinical outcome are known.

According to another aspect of the invention, the least one fluorescence dye is a fluorescent direct stain.

According to yet another aspect of the invention, the biomarker is a morphological biomarker and/or a cancer specific biomarker and/or another disease, different from cancer, specific biomarker. Thereby, it is possible to annotate different types of cancer and different types of other diseases which are not cancer.

According to a further aspect of the invention, removing the first histochemical dye from the tissue slide comprises using a detergent or a solvent or a bleach.

According to an aspect of the invention, the second histochemical dye is selected from a group comprising Haematoxylin, Eosin, van Gieson, Toluidine blue, Silver stain, Periodic acid-Schiff (PAS), Glycogen stain, Weigerts stain, Nissl stain, Golgi stain, Safranin, Oil Red, Prussian blue, Picro-Sirius Red, Mallary's trichome, Steiner Stain, Iron Hematoxylin and Fleugen stain.

According to a further aspect of the invention, the pathological anomaly is an infection or an inflammation or a cancer tumor.

According to an aspect of the invention, the at least one first image of the tissue slide and the at least one second image of the tissue slide are images of a single tissue slide or a series of consecutive tissue slides.

According to another aspect of the invention, annotating comprises layering the at least one first image of the tissue slide and the at least one second image of the tissue slide over another and using the stained region of the at least one first image of the tissue slide as mask for cropping the at least one second image of the tissue slide.

More specifically, the system for detecting pathological anomalies in a digital pathology image comprises a digital pathology image receiving module and a digital pathology image analyzing module. The digital pathology image analyzing module comprises an identification module. The identification module comprises a machine learning module and an identification model. The machine learning module comprises a recognizing module for recognizing an object containing an abnormal image pattern using the identification model and an identifying module for identifying whether the abnormal image pattern corresponds to a pathological anomaly using the identification model. Thereby, it is possible to provide a system which automatically detects pathological anomalies in a digital pathology image.

According to an aspect of the invention, the identification model comprises a classifier to classify the abnormal image pattern in accordance with at least two classes and a determining module for determining whether the abnormal image pattern corresponds to a pathological anomaly based on the classification.

According to another aspect of the invention, the system further comprises an identification model providing module. The identification model providing module comprises a training module for training a machine learning algorithm based at a plurality of annotated digital pathology images. The machine learning module can be a deep convolutional neural network and the machine learning algorithm can be a deep convolutional neural network algorithm.

According to a further aspect of the invention, the system further comprises an user interface comprising an input module for providing a digital pathology image to the system and an output module for displaying detected pathological anomalies in the digital pathology image. Thereby it is possible for the user to interact with the computing system.

Other objectives, embodiments and advantages of the present invention are described in closer detail in the description and in the subsequent patent claims.

BRIEF DESCRIPTION OF THE DRAWINGS

The present invention will now be described, for exemplary purposes, in more detail by way of embodiments and with reference to the enclosed drawings, in which.

DETAILED DESCRIPTION OF EMBODIMENTS

In the following a number of embodiments of the invention are shown and described. The same reference numbers have been used for the same or similar features throughout the description in the embodiments disclosed below.

Figure 1:
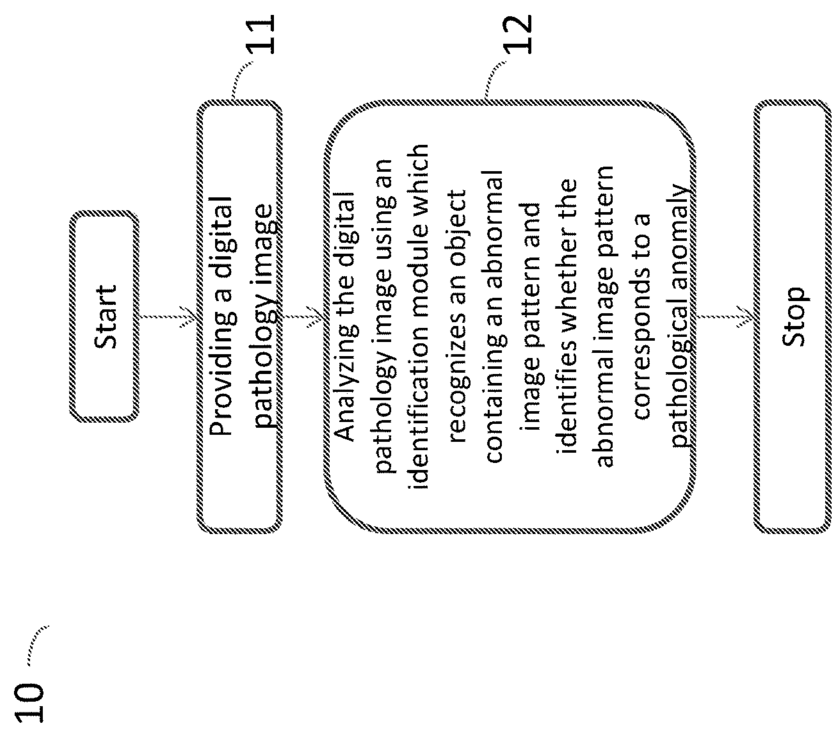
FIG. 1 is a flow diagram illustrating the steps of a method performed by a computing system for detecting pathological anomalies in a digital pathology image according to an embodiment of the present invention.
Figure 5:
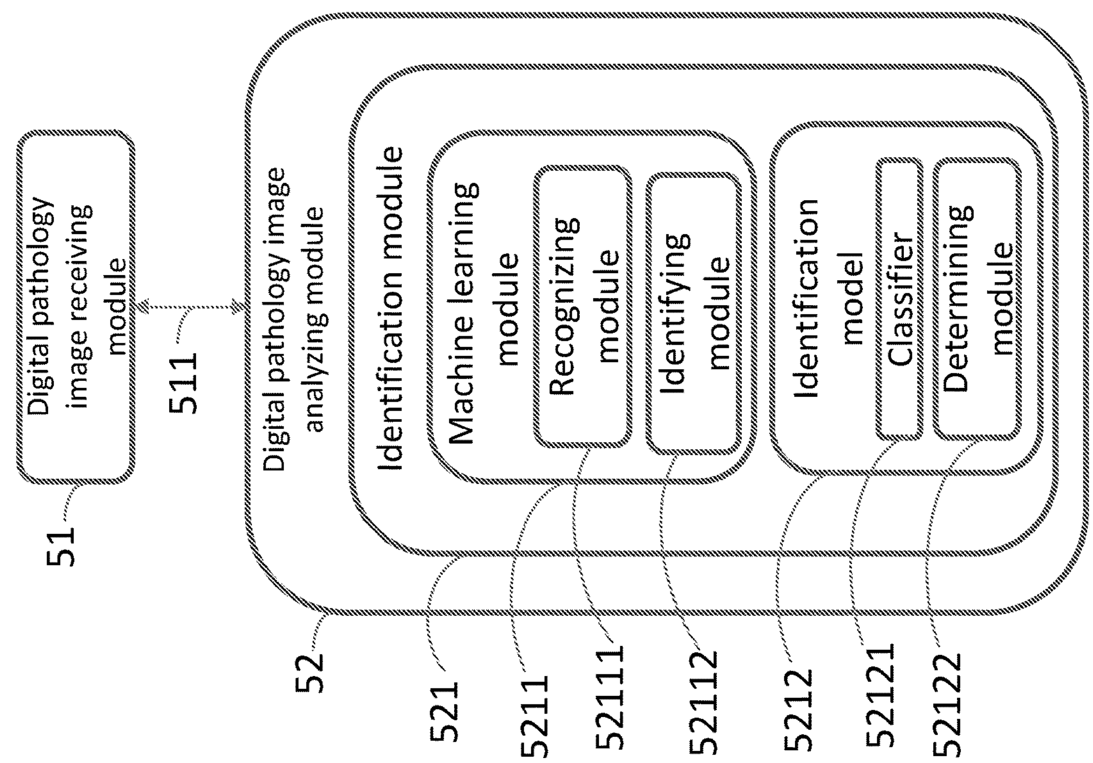
FIG. 5 is a schematic view of a system for detecting pathological anomalies in a digital pathology image according an embodiment of the present invention.
Figure 6:
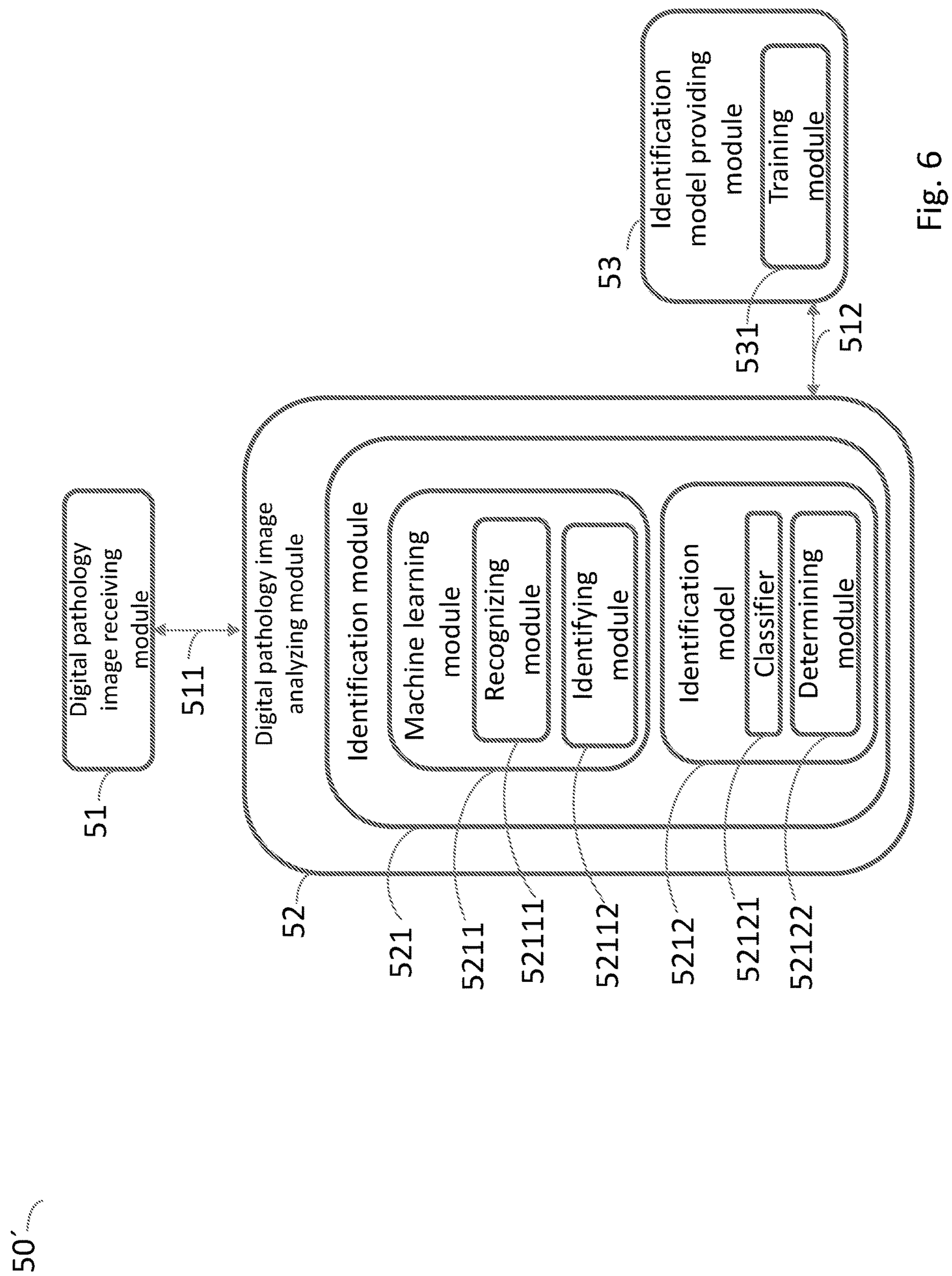
FIG. 6 is a schematic view of a system for detecting pathological anomalies in a digital pathology image according another embodiment of the present invention.
Figure 7:
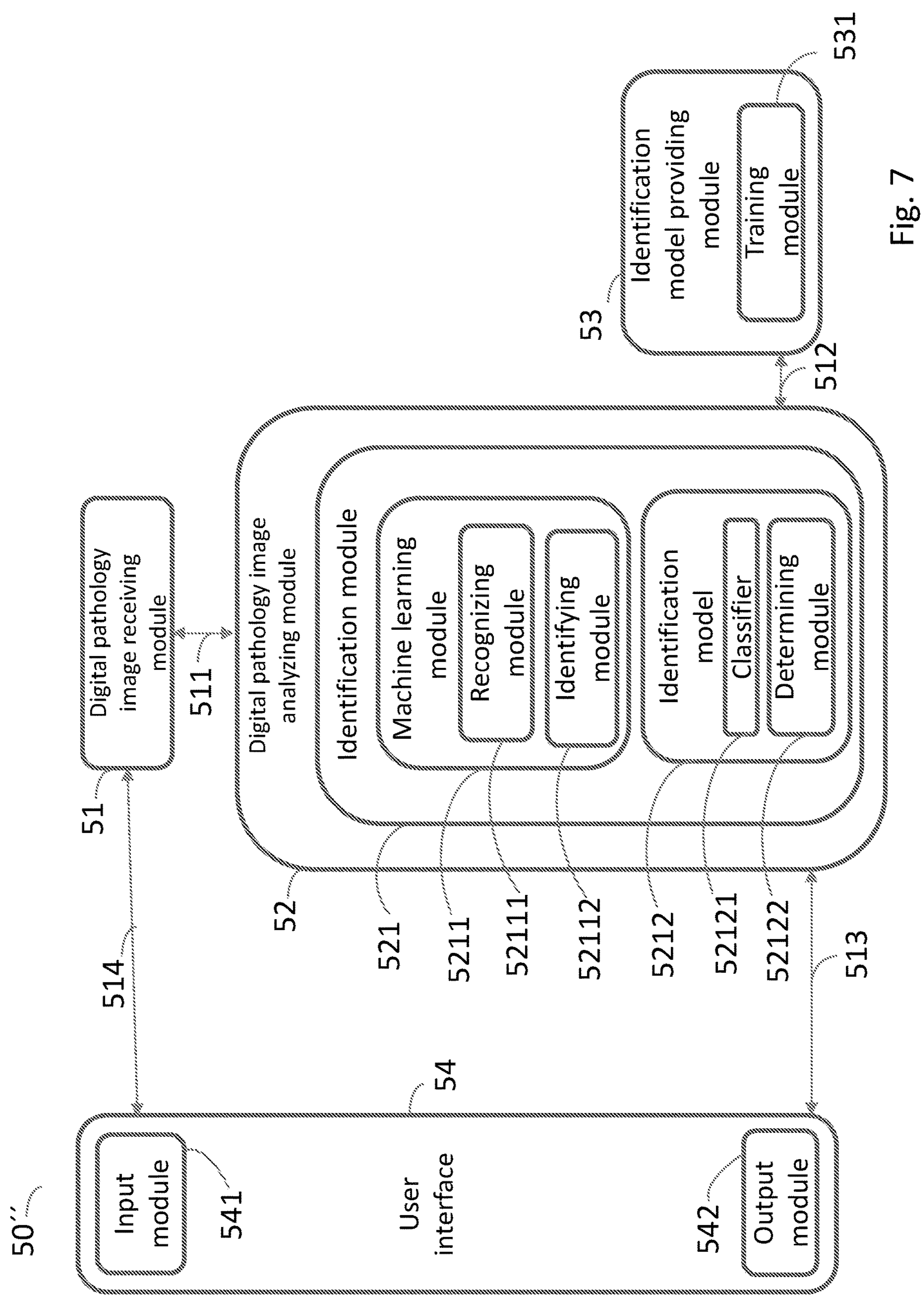
FIG. 7 is a schematic view of a system for detecting pathological anomalies in a digital pathology image according a further embodiment of the present invention.

FIG. 1 is a flow diagram illustrating the steps of a method 10 performed by a computing system 50, 50', 50", 50'" (the system is described further down in the text; in the text describing FIG. 5-7) for detecting pathological anomalies in a digital pathology image, i.e. a visual representation of the interior of a body for clinical analysis, according to an embodiment of the present invention. Said pathological anomaly can for example be an infection or an inflammation or a cancer tumour. The infection can for example be cholera, dengue or malaria and the inflammation can for example be appendicitis, bursitis or colitis. The cancer tumour can for example be a prostate cancer tumour or a breast cancer tumour.

The method comprises providing a digital pathology image to the computing system 50, 50', 50", 50''' at a step 11. Thereafter, analyzing the digital pathology image using an identification module 521 arranged on the computing system 50, 50', 50", 50''' at a step 12. The identification module 521 uses a machine learning module 5211 to execute recognizing an object containing an abnormal image pattern using an identification model 5212 loaded in said identification module 521 and identifying whether the abnormal image pattern corresponds to a pathological anomaly using the identification model 5212. A cancer develops when normal cells in the body begin to develop an abnormal growth pattern. The abnormal growth pattern is visualized as an abnormal image pattern in the image of the tissue slide.

Identifying whether the abnormal image pattern corresponds to a pathological anomaly comprises classifying the abnormal image pattern using a classifier 52121 in the identification model 5212 to classify the abnormal image pattern in accordance with at least two classes and determining whether the abnormal image pattern corresponds to a pathological anomaly based on the classification. The at least two classes can for example be disease affected tissue and non-affected tissue, for example benign tissue (i.e. of no danger to health, not malignant or disease-causing).

The class can for example also be a cancer type and/or a cancer grade and/or a cancer stage. The cancer type can for example be breast cancer, prostate cancer, liver cancer or lung cancer. Cancer grades are used for classifying cancer cells, for example Elston grade for breast cancer or Gleason grade for prostate cancer. The cancer is graded based on how different the cancer cells look from normal cells (differentiation), how quickly they are growing and dividing, and how likely they are to spread. Cancer stages are used for classifying a cancer based on the extent of cancer in the body. The cancer stage can be based on the size of the tumour, whether the cancer has spread (metastasized) from where it started to other parts of the body and where it has spread.

Different staging and grading systems are used for different cancers. Some types of cancer do not have a specific staging or grading system. Cancer tumours can for example be described with a low cancer grade or a high cancer grade. Their grade can be based on their degree of differentiation and their growth rate. Low-grade cancer cells are usually well differentiated and the tumours are slower growing. High-grade cancer cells are usually poorly differentiated or undifferentiated, and the tumours are faster growing and spread earlier.

Figure 2:
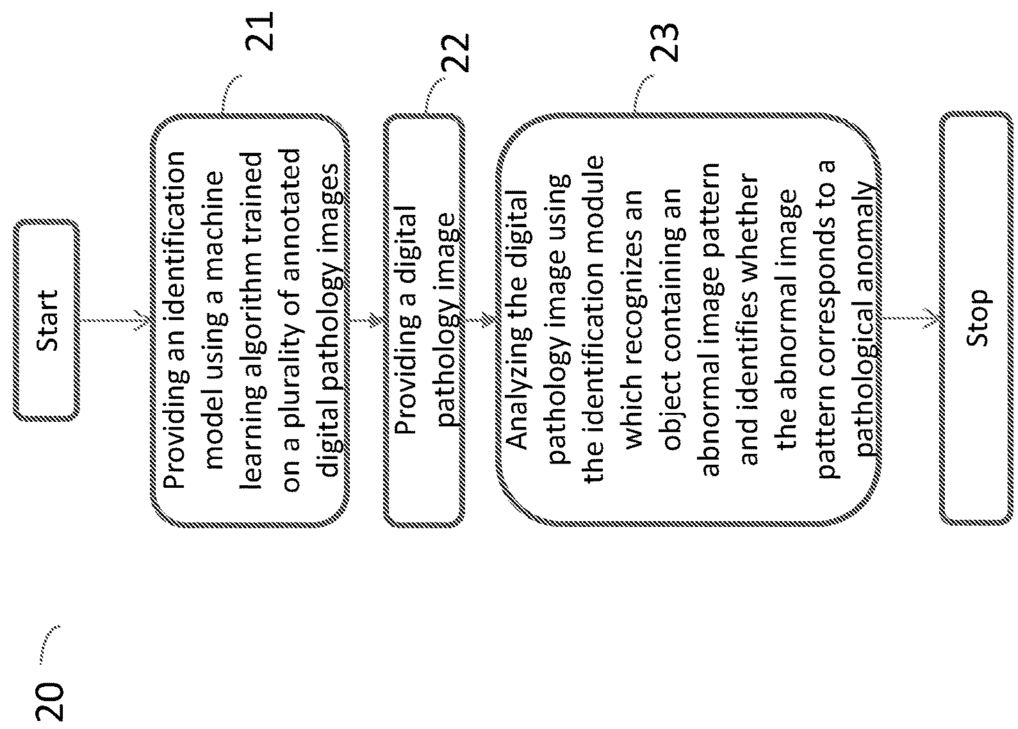
FIG. 2 is a flow diagram illustrating the steps of a method performed by a computing system for detecting pathological anomalies in a digital pathology image according to another embodiment of the present invention.

FIG. 2 is a flow diagram illustrating the steps of a method 20 performed by a computing system 50, 50', 50", 50''' for detecting pathological anomalies in a digital pathology image according to another embodiment of the present invention.

The method in FIG. 2 is the same as the method in FIG. 1 except from that it further comprises providing the identification model 5212 using a machine learning algorithm trained on a plurality of annotated digital pathology images in step 21.

An algorithm is a self-contained step-by-step set of operations to be performed. Step 22 in FIG. 2 is the same as step 11 in FIG. 1 and step 23 in FIG. 2 is the same as step 12 in FIG. 1.

Now the term "machine learning" will be explained. Machine learning is a type of artificial intelligence (AI) that provides computers with the ability to learn from examples without being explicitly programmed for that task. Machine learning algorithms build models from an example training set of input observations and expressed as outputs. Machine learning enables the development of computer programs that can expand and adapt when exposed to new data. Machine learning extracts and detects patterns in the data and adjust program actions accordingly. Said machine learning module can for example be a deep convolutional neural network and the machine learning algorithm can for example be a deep convolutional neural network algorithm.

Now the term "deep learning" will be explained. Deep learning, also known as deep structured learning, hierarchical learning or deep machine learning is a branch of machine learning based on a set of algorithms which are modelled loosely after the human brain and designed to recognize patterns in data. Traditional machine learning relies on shallow nets, composed of one input layer and one output layer, and at most one hidden layer in between. Deep learning relies on deep nets, i.e. an input layer, an output layer and more than one hidden layer. Deep-learning networks end in an output layer; a classifier that assigns a likelihood to a particular outcome.

Providing the identification model comprises generating at least one first image of a tissue slide comprising stained morphological features of the pathological anomaly. For example 4 first images can be generated. Morphological features are for example the form, shape and structure of parts of the tissue sample. The tissue slide is stained with at least one biomarker and at least one first histochemical dye or at least one biomarker and at least one fluorescent dye or at least one fluorescent biomarker and the at least one first image is annotated by using the stained regions. The tissue slides are colourless and it is therefore they need to be stained to distinguish structural details. The staining of the tissue slides can be done manually or by means of a staining machine.

Providing the identification model 5212 can also comprise providing the annotated images to the machine learning module 5211 and training the identification model 5212 using different morphological features of the pathological anomalies to obtain the classifier 52121.

Providing the identification model 5212 can also comprise providing a tissue slide with pathological anomalies; selecting at least one biomarker and at least one first histochemical dye or at least one biomarker and at least one fluorescent dye or at least one fluorescent biomarker, specific for a respective pathological anomaly; staining the tissue slide with the at least one biomarker and the at least one first histochemical dye or the at least one biomarker and the at least one fluorescent dye or the at least one fluorescent biomarker; generating at least one first image of the tissue slide; removing the first histochemical dye from the tissue slide; staining the tissue slide with a second histochemical dye; generating at least one second image of the tissue slide; annotating the at least one second image of the tissue slide; providing the annotated images to the machine learning module 5211 and training the identification model 5212 using different morphological features of the pathological anomalies to obtain the classifier 52121. For example 16 first images and 1 second image can be generated. The step removing the first histochemical dye from the tissue slide is of course only done if the tissue slide has been stained with a first histochemical dye. It is possible to also train the machine learning module with images not comprising pathological anomalies, for example to train it with both images which comprises pathological anomalies and images which do not comprise pathological anomalies.

It is to be notated that, if the at least one first image of the tissue slide and the at least one second image of the tissue slide are images of a single tissue slide, that it is the same tissue slide that is first stained with at least one biomarker and at least one first histochemical dye or at least one biomarker and at least one fluorescence dye or at least one fluorescent biomarker and later with a second histochemical dye. Thus, it is not different tissue slides, for example adjacent tissue slides (i.e. tissue slides adjacent each other during sectioning of a tissue sample). Thus, the at least one first image and the at least one second image are images of the same tissue slide.

The case is the same if the at least one first image of the tissue slide and the at least one second image of the tissue slide are images of a series of consecutive tissue slides. Each individual tissue slide of the series of consecutive tissue slides is first stained with at least one biomarker and at least one first histochemical dye or at least one biomarker and at least one fluorescence dye or at least one fluorescent biomarker and later with a second histochemical dye. Thus, a first tissue slide is first stained with at least one biomarker and at least one first histochemical dye or at least one biomarker and at least one fluorescence dye or at least one fluorescent biomarker and later with a second histochemical dye, then a second tissue slide is first stained with at least one biomarker and at least one first histochemical dye or at least one biomarker and at least one fluorescence dye or at least one fluorescent biomarker and later with a second histochemical dye, and then the procedure is repeated with the rest of the tissue slides of the series of consecutive tissue slides.

Figure 4:
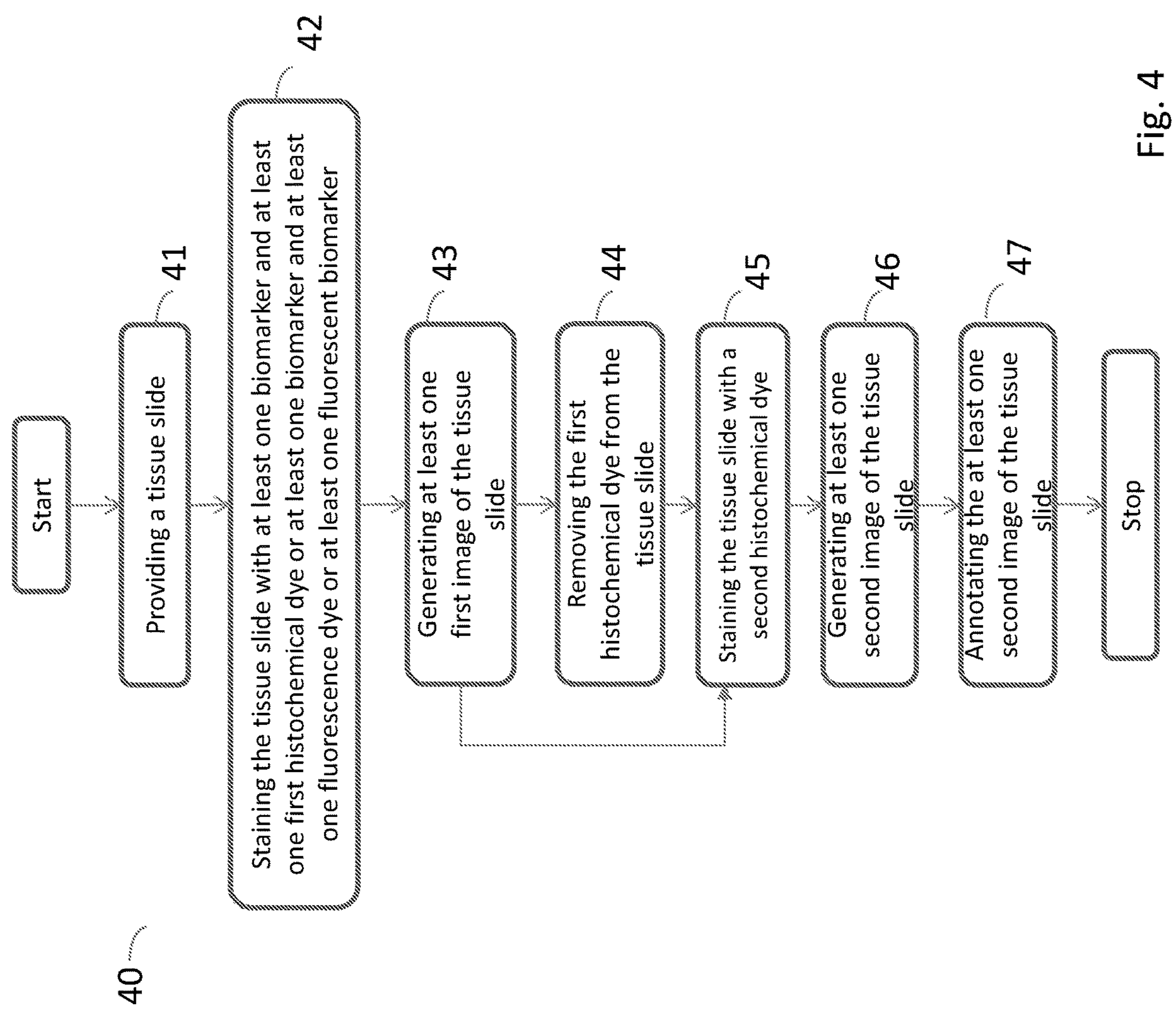
FIG. 4 is a flow diagram illustrating the steps of a method for annotating a tissue slide image according to the present invention.

The above mentioned steps providing a tissue slide with pathological anomalies; staining the tissue slide with the at least one biomarker and the at least one first histochemical dye or the at least one biomarker and the at least one fluorescent dye or the at least one fluorescent biomarker, specific for a respective pathological anomaly; generating at least one first image of the tissue slide; removing the first histochemical dye from the tissue slide; staining the tissue slide with a second histochemical dye; generating at least one second image of the tissue slide and annotating the at least one second image of the tissue slide by using a stained region of the at least one first image of the tissue slide are also comprised in the method for annotating a tissue slide shown in FIG. 4. Thus, the text describing these steps are also true for the method for annotating a tissue slide.

A tissue slide is produced by the steps collecting, fixating, embedding by using a medium that solidifies the tissue sample, sectioning, removing said medium and rehydrating the tissue sample. The tissue sample can be collected by for example an excision biopsy or a needle biopsy. Excision biopsy is a medical procedure during which a part or the whole of an organ or tissue is removed from a part of the body. In case of a needle biopsy, a thin needle is inserted into the tissue and a small sample of histologically intact tissue is extracted.

Thereafter, the tissue sample is placed in a fixative, e.g. formalin, to prevent decay and to stabilize the tissue and the cell components to maintain a cellular structure as close to the native state as possible. The fixation is followed by embedding, in which water is removed from the tissue sample and replaced with a medium that solidifies the sample. The medium can for example be paraffin wax which together with the tissue sample will form a paraffin block.

The tissue sample is then sectioned, e.g. by means of a microtome, to produce sufficiently thin slides for the details of the structures of the tissues and individual cells to be clearly visible for a WSI (whole slide image) imaging device. The thickness of the tissue slide is typically 3-5 μm, but the tissue slide can be thicker, e.g. for analysis of an optically sectioned 3D volume. Thereafter the medium that solidifies the tissue sample is removed. Thus, if the medium comprises paraffin wax, the sections are deparaffinised. Then, the tissue sample is re-hydrated. It is also possible to use a tissue slide which has been stored, for example by being frozen, or to use a stored paraffin block and thereafter do the steps sectioning, removing the medium that solidifies the tissue sample medium and rehydrating the tissue sample.

Now the different types of stainings will be described. A biomarker can be a chemical compound with specific affinity to biological structures or molecules, e.g. DAPI that binds to DNA or Nile Red that binds to lipids. DAPI and Nile Red are fluorescence dyes. It can also be a chemical compound which are conjugated with a fluorescent or histochemical marker or detected with an antibody with a histochemical or fluorescent marker. A biomarker can also be an antibody with specificity to a specific molecule or a specific nucleotide that recognize a specific strand of RNA or DNA in the tissue (in situ hybridization). mRNA can detect cell/tissue specific gene expression. DNA can detect gene duplications, translocations or foreign DNA from bacteria or virus.

A fluorescent biomarker can be a chemical compound that binds to a specific biological structure and can emit fluorescence when excited with light of a specific wavelength, e.g. DAPI that binds to DNA and emits blue light with excited with near UV light.

The fluorescent biomarker can also be an antibody that binds to a specific antigen and is labelled with a fluorescent marker, often a secondary antibody has the fluorescent marker. For example an anti Ki67 antibody made in rabbit detects the Ki67 antigen on a tissue slide, a secondary antibody against rabbit antibodies carries a fluorescent marker, e.g. Alexa 488 that emits green light when excited with blue light.

A synthesized specific nucleotide sequence can also be used as a biomarker. It can detect specific expression of mRNA in a cell and thereby indicate the synthesis of the protein encoded by the specific nucleotide sequence. The nucleotide sequence then needs to be visualized and this can be done in many ways, e.g. incorporation of fluorescent nucleotides, incorporation of chemical compounds that can be detected with fluorescence labelled antibodies or antibodies labelled with a histochemical dye, or a rtPCR reactions directly on the slice with incorporated fluorescent dyes.

A synthesized specific nucleotide sequence can also be used to visualize cells with mutations in the DNA strand. This will show cancer cells that have multiple numbers of chromosomes, dislocation of chromosome arms, or other anomalies in the DNA.

Immunohistochemically staining is a type of histochemically staining and immunofluorescence staining is a type of fluorescence staining. Immunohistochemically staining and immunofluorescence staining is always accomplished with antibodies. Antibodies are used by the immune system to attack foreign molecules that enter the body. A molecule that evokes the production of an antibody, that binds to it specifically, is referred to as an antigen. The antigen is used as a molecular marker and is a protein that is characteristic of cellular events such as proliferation or cell death. Since antibodies are highly specific, the antibody will bind only to the antigen of interest in the tissue sample. Immunohistochemically staining uses an immunohistochemically dye which produce a colored precipitate at the location of the antigen to visualize the antibody-antigen interaction. Immunofluorescence staining uses an antibody which is chemically linked to a fluorophore. The antibody recognizes the antigen and binds to it, and the fluorophore it carries will emit a specific wavelength of light once excited and is visualized using a fluorescence microscopy.

The biomarker can be a morphological biomarker and/or a cancer specific biomarker and/or another disease, different from cancer, specific biomarker. The morphological biomarker can for example be EMT (epithet-mesenchymal transition) which is a morphological biomarker of tumour progression. An example of a cancer specific biomarker is aberrant crypt foci (ACF) which is a morphological biomarker of colon cancer. Another disease, different from cancer, specific biomarker can for example be endogenous peroxidases which is a biomarker of inflammatory skin diseases.

Examples of antibodies which can be used are ACTH, ACTIN, ADENOVIRUS, AFP, ALK-1, AMYLOID A, ANDROGEN RECEPTOR, ANNEXIN, ARGINASE-1, BAP1, B-AMYLOID, BCL-1, BCL-2, BCL-6, BEREP4, Beta-Catenin, BOB1, BRACHYURY, BRST-2, C3d, C4d, CALCITONIN, CALDESMON, CALPONIN, CALRETININ, CAT SCRATCH, CD10, CD14, CD117, CD117 BM, CD123, CD138, CD15, CD163, CD1a, CD2, CD20, CD21, CD23, CD25, CD3, CD30, CD31, CD33, CD34, CD34 BM, CD38, CD4, CD43, CD45RA, CD45RB, CD45RO, CD5, CD56, CD57, CD61, CD68, CD7, CD79a, CD8, CD99, CDX2, CEAm, CEAp, Chromogranin, Chymotrypsin, CK MIX, CK20, CK34BE12, CK5/6, CK7, CK19, CKAE1/AE3, CKCAM5.2, CMV, c-Myc, CXCL13, CYCLIN D2, CYCLIN D3, D2-40, DBA-44, Desmin, DOG-1, EBV, LMP, E-Cadherin, EGFR, EMA, EMA-Perineurioma, ER, ERG, Factor 13a, Factor 8, FOXP1, FSH, GALECTIN-3, Gastrin, GATA-3, GFAP, GH, Glucagon, Glut1, Glutamine synthetase, Glypican-3, GPC, GRANZYME, *H. pylori*, HBC, HBS, hCG, HepPar 1, Her2neu, HGAL, HHV-8, HMB-45, HPL, HSV, IDH1, IgA, IgD, IgG, IgG4, IgM, Inhibin, INI, Insulin, ISH EBV, ISH HPV, ISH KAPPA, ISH LAMBDA, KAPPA, KBA62, KI67, Lambda, LANGERIN, LAT, LEF1, LH, LM02, LYSOZYME, MAP-2, MCT, MELAN A, MITF, MLH1, MNDA, MOC-31, MPO, MSH2, MSH6, MUC2, MUCSAC, MUM1, Myogenin, Napsin A, NB84, NEU N, Neurofilament, NKI/C3, NKX3.1, NPM, NSE, NUT, OCT-2, Oct-3/4, p16, p53, p57, p63, Parvovirus, PAX-2, PAX-5, PAX8, PD-1, Perforin, PHH3, PHLDA1, PIN4, PLAP, PMS2, PR, PRAP, Prolactin, Prox1, PSA, RNA, S100, S100P, SALL4, SF-1, SMA, SMMS, Somatostatin, SOX-10, SOX11, Spirochetes, STAT6, SV40, SYNAP, Tamm-Horsfall, T-bet, TCL-1, TCR, TCR Gamma, TdT, THYRO, TIA-1, TOXO, Transthyretin, TRAP, TSH, TTF1, Tyrosinase, VIMENTIN, WT1, WT1 (C-19) and ZAP70. There are thousands of specific antibodies and the person skilled in the art understands that it is possible to use other diagnostic antibodies than those mentioned above.

The first histochemical dye can be an immunohistochemically dye. DAB, Fast Red, AEC, BCIP/NBT, AP-Red, Permanent Red, TMB and Emerald are examples of immunohistochemically dyes (chromogens) which can be used. The fluorescence dye can be an immunofluorescence dye. Examples of immunofluorescence dyes (fluorochromes) that can be used are Alexa stains, Cy3, Cy5, Cy7, Bodipye, Fluorecein, FITC, TRITC and Rhodamin. Examples of other fluorescence dyes which can be used are Acridine orange, DAPI (which stains DNA), Ethidium bromide, Hoechst stains and Nile red. (When using a fluorescence dye antibodies are not used.) The mentioned fluorescence dyes are fluorescent direct stains. The person skilled in the art understands that it is possible to use other histochemically dyes and fluorescence dyes than those mentioned above.

The second histochemical dye can for example be Haematoxylin, Eosin, van Gieson, Toluidine blue, Silver stain, Periodic acid-Schiff (PAS), Glycogen stain, Weigerts stain, Nissl stain, Golgi stain, Safranin, Oil Red, Prussian blue, Acid fuchsine, Carmin, Conklin's stain, Cresyl violet, Crystal violet, Giemsa stain, Gram stain, Haematoxylin, Haematoxylin and eosin (H&E) stain, Jenner's stain, Leishman stain, Masson's trichrome, May-Grunwald stain, Methyl green, Methylene blue, Neutral red, Nile blue, Papanicolaou stain (Pap), PAS stain, Romanowsky stains, Sudan stain, Wright's stain and Ziehl-Neelsen stain, Picro-Sirius Red, Mallary's trichome, Steiner Stain, Iron Hematoxylin and Fleugen stain. The person skilled in the art understands that it is possible to use other second histochemical dyes than those mentioned above.

Generating a first image of the tissue slide comprises generating a WSI (whole slide imaging) image by means of a WSI imaging device. A WSI imaging device comprises hardware and associated software required to generate a whole slide image which is a single, high magnification digital image of an entire tissue slide. The WSI imaging device can for example be a whole slide scanner with fluorescence (e.g. Hamamatsu NANOZOOMER XR) a regular fluorescence microscope (e.g. Zeiss Axio Imager 2) or a confocal scanner (e.g. Leica TCS SP8). Images can be acquired by line scanning acquisition or by single photo acquisition, in both cases the information is tiled to a large WSI. A confocal scanner scans the tissue slide sequentially point by point, or multiple points at once, and assembles the pixel information into a digital image. The confocal scanner can for example comprise a 40× objective. By using a confocal scanner optical sections with high contrast and high resolution in the x, y and z axes of the tissue slide are acquired. When viewing a whole slide image it is possible to focus up and down through the tissue.

Preferably a multi-channel, for example a 4-channel or 16-channel, WSI imaging device is used. It is also possible to use a 1-channel scanner. If a tissue sample is stained with for example multiple fluorescence dyes, which emit light at different wavelengths (also referred to as "channels") a multi-channel WSI imaging device scans and digitizes the tissue slide multiple times; once for each emission wavelength (i.e. channel). If for example the tissue slide is stained with four different fluorescence dyes, for example DAPI, antibody with Alexa 488, antibody with Alexa 555 and antibody with Alexa 633, four different first images of the tissue slide will be generated with a 4-channel scanner.

The second image is preferably also a WSI image and the at least one second image is preferably retrieved by means of a RGB digital camera by which red, green, and blue light are added together in various ways to reproduce a broad array of colours. Both the at least one first image of the tissue slide and the at least one second image of the tissue slide are images of a single tissue slide or a series of consecutive tissue slides. 3D volumes can be formed by stacking multiple 2D images. Several 2D images can be generated with for example different planes of focus, depths and directions to form a 3D volume which represents the tissue slide. The 3D volume makes it possible to analyse the tissue slide in three axes; the x, y and z axes (it is only possible to analyse a 2D image in two axes).

Before generating a first image and a second image the tissue slide is mounted on a clear glass slide and covered with a coverslip to preserve and support the stained section for light microscopy. A cover slip is a thin flat piece of transparent material used to keep the tissue slide pressed flat. This is necessary because high-resolution microscopes have a very narrow region within which they focus. A mounting medium is used to adhere the coverslip to the slide. A water soluble mounting media which allow the mounting of tissues directly from the staining procedure can be used. Before removing the first histochemical dye from the tissue slide the coverslip is removed from the tissue slide.

The first histochemical dye can be removed from the tissue slide by washing the tissue slide with a detergent or a solvent or a bleach. It is for example possible to remove the stain by using an alcohol if the tissue slide was stained with AEC. If the tissue slide was stained with at least one biomarker and at least one fluorescent dye or at least one fluorescent biomarker said stains do not need to be removed.

Annotating the at least one second image of the tissue slide is done by layering the at least one first image of the tissue slide and the at least one second image of the tissue slide over another, for example one second image above one first image, and using the stained region of the at least one first image of the tissue slide as mask for cropping the at least one second image of the tissue slide. If for example the tissue slide is stained with four different fluorescence dyes and in a later step with a histochemical dye, four different first images of the tissue slide will be generated with a 4-channel scanner and one second image of the (same) tissue slide will be generated. The four different first images can for example show nucleus, gland morphology, glands with adenocarcinoma, and glands with basal cells. The first image showing glands with adenocarcinoma can be layered over the second image of the tissue slide and the adenocarcinoma region of the first image showing glands with adenocarcinoma can be used as mask for cropping the at least one second image of the tissue slide. The procedure can then be repeated with the other three first images of the tissue slide. The overlaying is done with the WSI imaging device described above.

Training the identification module can comprise using clinical outcome. Clinical outcome involves a diagnosis or assessment by a health care provider and may be recorded in a patient's medical record. The clinical outcome comprises for example the effects of a disease, how the patient functions and whether or not a clinical treatment has been demonstrated to provide treatment benefit.

Providing a tissue slide can comprise selecting a tissue slide from a patient where patient data and/or clinical treatment and/or clinical outcome are known. Patient data is information about an individual patient, for example age and sex. Clinical treatment is the medical treatment that is given to a patient in a hospital or clinic, for example surgery and immunotherapy.

Figure 3:
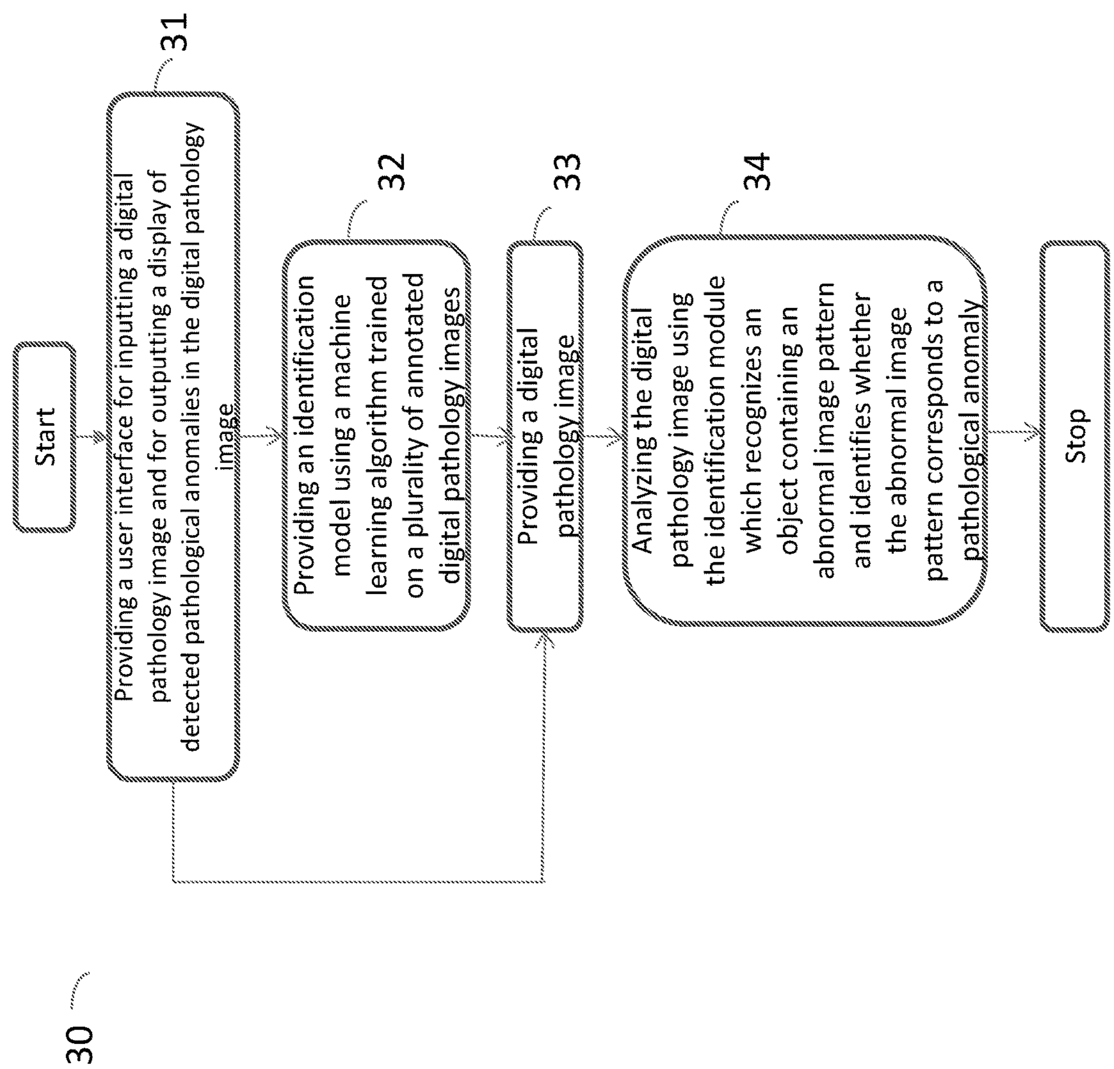
FIG. 3 is a flow diagram illustrating the steps of a method performed by a computing system for detecting pathological anomalies in a digital pathology image according to a further embodiment of the present invention.

FIG. 3 is a flow diagram illustrating the steps of a method 30 performed by a computing system 50, 50', 50", 50'" for detecting pathological anomalies in a digital pathology image according to a further embodiment of the present invention. FIG. 3 is exactly the same as FIG. 2 except from that is also comprises providing a user interface 54, i.e. interface features through which users interact with the system, for inputting a digital pathology image to the computing system 50, 50', 50", 50'" and for outputting a display of detected pathological anomalies in the digital pathology image in a step 31. Step 32 is the same as step 21 in FIG. 2, step 33 is the same as step 22 in FIG. 2 and step 34 is the same as step 23 in FIG. 2. Outputting a display of detected pathological anomalies in the digital pathology image can comprise using a monitor (not shown), i.e. a computer screen or a device with a screen on which words and/or images can be shown, or a printer (not shown). It is possible to display the detected anomalies by showing the whole tissue slide with annotated regions or to only show the annotated regions. The output can also be used for calculating a cancer grade, for example a Gleason grade for prostate cancer.

FIG. 4 is a flow diagram illustrating the steps of method 40 for annotating a tissue slide image according to the present invention. Said method comprises providing a tissue slide with pathological anomalies in a step 41; staining the tissue slide with at least one biomarker and at least one first histochemical dye or at least one biomarker and at least one fluorescent dye or at least one fluorescent biomarker, specific for a respective pathological anomaly in a step 42; generating at least one first image, for example 16 first images, of the tissue slide in a step 43; removing the first histochemical dye from the tissue slide in a step 44; staining the tissue slide with a second histochemical dye in a step 45; generating at least one second image, for example 1 second image, of the tissue slide in a step 46 and annotating the at least one second image of the tissue slide by using a stained region of the at least one first image of the tissue slide in a step 47. Step 44 is of course only done if the tissue slide has been stained with a first histochemical dye.

As described before, the above mentioned steps (i.e. providing a tissue slide with pathological anomalies; staining the tissue slide with at least one biomarker and at least one first histochemical dye or at least one biomarker and at least one fluorescent dye or at least one fluorescent biomarker, specific for a respective pathological anomaly; generating at least one first image of the tissue slide; removing the first histochemical dye from the tissue slide; staining the tissue slide with a second histochemical dye; generating at least one second image of the tissue slide and annotating the at least one second image of the tissue slide by using a stained region of the at least one first image of the tissue slide) are described earlier when describing the method performed by a computing system 50, 50', 50", 50'" for detecting pathological anomalies in a digital pathology image. Thus, the text describing said steps in the description of the method performed by a computing system for detecting pathological anomalies in a digital pathology image is also true for the steps comprised in the method for annotating a tissue slide image. Therefore, the method for annotating a tissue slide image will only be described briefly in the text describing FIG. 4.

Providing a tissue slide can comprise selecting a tissue slide from a patient where patient data and/or clinical treatment and/or clinical outcome are known. The at least one fluorescence dye can for example be a fluorescent direct stain. The biomarker can be a morphological biomarker and/or a cancer specific biomarker and/or another disease, different from cancer, specific biomarker. Removing the first histochemical dye from the tissue slide can comprise using a detergent or a solvent or a bleach. The pathological anomaly can be an infection or an inflammation or a cancer tumor. The at least one first image of the tissue slide and the at least one second image of the tissue slide are images of a single tissue slide or a series of consecutive tissue slides.

Annotating comprises layering the at least one first image of the tissue slide and the at least one second image of the tissue slide over another and using the stained region of the at least one first image of the tissue slide as mask for cropping the at least one second image of the tissue slide.

As mentioned above, it is to be notated that, if the at least one first image of the tissue slide and the at least one second image of the tissue slide are images of a single tissue slide, that it is the same tissue slide that is first stained with at least one biomarker and at least one first histochemical dye or at least one biomarker and at least one fluorescence dye or at least one fluorescent biomarker and later with a second histochemical dye. Thus, it is not different tissue slides, for example adjacent tissue slides (i.e. tissue slides adjacent each other during sectioning of a tissue sample). Thus, the at least one first image and the at least one second image are images of the same tissue slide.

The case is the same if the at least one first image of the tissue slide and the at least one second image of the tissue slide are images of a series of consecutive tissue slides. Each individual tissue slide of the series of consecutive tissue slides is first stained with at least one biomarker and at least one first histochemical dye or at least one biomarker and at least one fluorescence dye or at least one fluorescent biomarker and later with a second histochemical dye. Thus, a first tissue slide is first stained with at least one biomarker and at least one first histochemical dye or at least one biomarker and at least one fluorescence dye or at least one fluorescent biomarker and later with a second histochemical dye, then a second tissue slide is first stained with at least one biomarker and at least one first histochemical dye or at least one biomarker and at least one fluorescence dye or at least one fluorescent biomarker and later with a second histochemical dye, and then the procedure is repeated with the rest of the tissue slides of the series of consecutive tissue slides.

FIG. 5-7 are schematic views of a system 50, 50', 50", 50"" for detecting pathological anomalies in a digital pathology image according to the present invention. The system in FIG. 5 comprises a digital pathology image receiving module 51 and a digital pathology image analyzing module 52. The digital pathology image receiving module 51 receives the digital pathology image and then the digital pathology image analyzing module 52 analyzes the digital pathology image. The digital pathology image analyzing module 52 comprises an identification module 521. The identification module 521 comprises a machine learning module 5211 and an identification model 5212. The machine learning module 5211 comprises a recognizing module 52111 for recognizing an object containing an abnormal image pattern using the identification model 5212 and an identifying module 52112 for identifying whether the abnormal image pattern corresponds to a pathological anomaly using the identification model 5212. The identification model 5212 comprises a classifier 52121 to classify the abnormal image pattern in accordance with at least two classes and a determining module 52122 for determining whether the abnormal image pattern corresponds to a pathological anomaly based on the classification. The digital pathology image receiving module 51 and the digital pathology image analyzing module 52 are coupled to each other via a suitable connection 511.

The system 50' in FIG. 6 is exactly the same as the system 50 in FIG. 5 except from that it further comprises an identification model providing module 53. The identification model providing module 53 comprises a training module 531 for training a machine learning algorithm based at a plurality of annotated digital pathology images.

The above mentioned machine learning module 5211 can be a deep convolutional neural network and the machine learning algorithm can be a deep convolutional neural network algorithm. The identification model providing module 53 and the digital pathology image analyzing module 52 are coupled to each other via a suitable connection 512.

The system 50" in FIG. 7 is exactly the same as the system 50' in FIG. 6 except from that it further comprises a user interface 54 comprising an input module 541 for providing a digital pathology image to the system and an output module 542 for displaying detected pathological anomalies in the digital pathology image. The digital pathology image analyzing module 52 and the user interface 54 are coupled to each other via a suitable connection 513. The digital pathology image receiving module 51 and the user interface 54 are coupled to each other via a suitable connection 514. The output module 542 can comprise a monitor (not shown) or a printer (not shown). It is possible to display the detected anomalies by showing the whole tissue slide with annotated regions or to only show the annotated regions. The output can also be used for calculating a cancer grade, for example a Gleason grade for prostate cancer.

The invention shall not be considered limited to the embodiments illustrated, but can be modified and altered in many ways by one skilled in the art, without departing from the scope of the appended claims.

The invention claimed is:

1. A method performed by a computing system for detecting pathological anomalies in a digital pathology image, comprising:

providing a digital pathology image to the computing system;

providing an identification model using a machine learning algorithm trained on a plurality of annotated digital pathology images; and analyzing the digital pathology image using an identification module arranged on the computing system, wherein the identification module uses a machine learning module to execute:

recognizing an object containing an abnormal image pattern using the identification model loaded in said identification module; and identifying whether the abnormal image pattern corresponds to a pathological anomaly using the identification model, wherein providing the identification model comprises:

generating at least one first digital image of a tissue slide comprising stained morphological features of the pathological anomaly, wherein the tissue slide is stained with:

a first histochemical dye, or at least one biomarker and at least one fluorescence dye, or at least one fluorescent biomarker;

wherein said tissue slide is stained with multiple fluorescent dyes which emit light at different wavelengths;

generating at least one second digital image of the same tissue slide, wherein the tissue slide is stained with a second histochemical dye, said second histochemical dye is H&E;

annotating the at least one second digital image of the tissue slide by layering the at least one first digital image and the at least one second digital image over another; and providing the layered, annotated images to the machine learning module and training the identification model using different morphological features of the pathological anomalies to obtain a classifier, wherein the step of analyzing the digital pathology image comprises analyzing the multiple fluorescent dyes on the same tissue slide using the classifier.

2. The method according to claim 1, wherein identifying whether the abnormal image pattern corresponds to a pathological anomaly comprises:

classifying the abnormal image pattern using a classifier in the identification model to classify the abnormal image pattern in accordance with at least two classes; and determining whether the abnormal image pattern corresponds to a pathological anomaly based on the classification.

3. The method according to claim 2, wherein the at least one class is a cancer type and/or a cancer grade and/or a cancer stage.

4. The method according to claim 1, wherein providing the identification model comprises:

providing the annotated images to the machine learning module; and training the identification model using different morphological features of the pathological anomalies to obtain the classifier.

5. The method according to claim 4, wherein training the identification module comprises using clinical outcome.

6. The method according to claim 1, further comprising providing a user interface for inputting a digital pathology image to the computing system and for outputting a display of detected pathological anomalies in the digital pathology image.

7. The method according to claim 1, wherein the pathological anomaly is an infection or an inflammation or a cancer tumor.

8. The method according to claim 1, wherein the machine learning module is a deep convolutional neural network.

9. The method according to claim 1, wherein the machine learning algorithm is a deep convolutional neural network algorithm.

10. The method according to claim 1, wherein the at least one first image of the tissue slide and at least one second image of the tissue slide are images of a single tissue slide.

11. The method according to claim 1, wherein said at least one fluorescent biomarker is a chemical compound that binds to a specific biological structure and can emit fluorescence when excited with light of a specific wavelength or an antibody that binds to a specific antigen and is labelled with a fluorescent dye.

12. The method according to claim 1, wherein said at least one fluorescent dye is an immunofluorescent dye.

13. The method according to claim 1, wherein said at least one fluorescent dyes is a fluorescent direct stain.

14. The method according to claim 1, wherein said multiple fluorescent dyes are four different fluorescent dyes.

15. A method performed by a computing system for detecting pathological anomalies in a digital pathology image, comprising:

providing a digital pathology image to the computing system; and analyzing the digital pathology image using an identification module arranged on the computing system, wherein the identification module uses a machine learning module to execute:

recognizing an object containing an abnormal image pattern using an identification model loaded in said identification module; and identifying whether the abnormal image pattern corresponds to a pathological anomaly using the identification model, wherein providing the identification model comprises:

providing a tissue slide with pathological anomalies;

selecting at least one biomarker and at least one fluorescence dye, or at least one fluorescent biomarker, specific for a respective pathological anomaly;

staining the tissue slide with the at least one biomarker and the at least one fluorescence dye or, the at least one fluorescent biomarker, wherein said tissue slide is stained with multiple fluorescent dyes which emit light at different wavelengths;

generating at least one first digital image of the tissue slide;

staining the tissue slide with a first histochemical dye;

generating at least one second digital image of the same tissue slide, wherein the tissue slide is stained with a second histochemical dye, said second histochemical dye is H&E;

annotating the at least one second image of the tissue slide by layering the at least one first digital image and the at least one second digital image over another;

providing the annotated images to the machine learning module; and training the identification model using different morphological features of the pathological anomalies to obtain the classifier, and wherein the step of analyzing the digital pathology image comprises analyzing the multiple fluorescent dyes on the same tissue slide.

16. The method according to claim 15, wherein providing a tissue slide comprises selecting a tissue slide from a patient where patient data and/or clinical treatment and/or clinical outcome are known.

17. The method according to claim 15, wherein the at least one fluorescence dye is a fluorescent direct stain.

18. The method according to claim 15, wherein the biomarker is a morphological biomarker and/or a cancer specific biomarker and/or another disease, different from cancer, specific biomarker.

19. The method according to claim 15, wherein the histochemical dye are selected from a group comprising Haematoxylin, Eosin, van Gieson, Toluidine blue, Silver stain, Periodic acid-Schiff (PAS), Glycogen stain, Weigerts stain, Nissl stain, Golgi stain, Safranin, Oil Red, Prussian blue, Picro-Sirius Red, Mallary's trichome, Steiner Stain, Iron Hematoxylin and Fleugen stain.

20. The method according to claim 15, wherein annotating the at least one second image of the tissue slide comprises using the stained region of the at least one first image of the tissue slide as mask for cropping the at least one second image of the tissue slide.

21. The method according to claim 15, wherein said at least one fluorescent biomarker is a chemical compound that binds to a specific biological structure and can emit fluorescence when excited with light of a specific wavelength or an antibody that binds to a specific antigen and is labelled with a fluorescent dye.

22. The method according to claim 15, wherein said at least one fluorescent dye is an immunofluorescent dye.

23. The method according to claim 15, wherein said multiple fluorescent dyes are four different fluorescent dyes.

24. A method for annotating a tissue slide image, comprising:

providing a tissue slide with pathological anomalies;

staining the tissue slide with at least one biomarker and at least one fluorescence dye, or at least one fluorescent biomarker, specific for a respective pathological anomaly, wherein said tissue slide is stained with multiple fluorescent dyes which emit light at different wavelengths;

generating at least one first digital image of the tissue slide;

staining the tissue slide with a first histochemical dye;

generating at least one second digital image of the same tissue slide, wherein the tissue slide is stained with a second histochemical dye, said second histochemical dye is H&E;

annotating the at least one second image of the tissue slide by using a stained region of the at least one first image of the tissue slide; and providing the annotated images to the machine learning module and training the identification model using different morphological features of the pathological anomalies to obtain the classifier, wherein said step of annotating comprises layering the at least one first image of the tissue slide and the at least one second image of the tissue slide over another and using the stained region of the at least one first image of the tissue slide as mask for cropping the at least one second image of the tissue slide.

25. The method according to claim 24, wherein providing a tissue slide comprises selecting a tissue slide from a patient where patient data and/or clinical treatment and/or clinical outcome are known.

26. The method according to claim 24, wherein the at least one fluorescence dye is a fluorescent direct stain.

27. The method according to claim 24, wherein the biomarker is a morphological biomarker and/or a cancer specific biomarker and/or another disease, different from cancer, specific biomarker.

28. The method according to claim 24, wherein the second histochemical dye are selected from a group comprising Haematoxylin, Eosin, van Gieson, Toluidine blue, Silver stain, Periodic acid-Schiff (PAS), Glycogen stain, Weigerts stain, Nissl stain, Golgi stain, Safranin, Oil Red, Prussian blue, Picro-Sirius Red, Mallary's trichome, Steiner Stain, Iron Hematoxylin and Fleugen stain.

29. The method according to claim 24, wherein the pathological anomaly is an infection or an inflammation or a cancer tumor.

30. The method according to claim 24, wherein the at least one first image of the tissue slide and the at least one second image of the tissue slide are images of a single tissue slide.

31. The method according to claim 24, wherein said at least one fluorescent biomarker is a chemical compound that binds to a specific biological structure and can emit fluorescence when excited with light of a specific wavelength or an antibody that binds to a specific antigen and is labelled with a fluorescent dye.

32. The method according to claim 24, wherein said at least one fluorescent dye is an immunofluorescent dye.

33. The method according to claim 24, wherein said multiple fluorescent dyes are four different fluorescent dyes.

34. A system for detecting pathological anomalies in a digital pathology image, comprising:

a digital pathology image receiving module; and a digital pathology image analyzing module; wherein the digital pathology image analyzing module comprises an identification module, wherein the identification module comprises a machine learning module and an identification model, wherein the machine learning module comprises:

a recognizing module for recognizing an object containing an abnormal image pattern using the identification model; and an identifying module for identifying whether the abnormal image pattern corresponds to a pathological anomaly using the identification model, wherein the identification model is provided by using a machine learning algorithm trained on a plurality of annotated digital pathology images;

generating at least one first digital image of a tissue slide comprising stained morphological features of the pathological anomaly, wherein the tissue slide is stained with:

a first histochemical dye, or at least one biomarker and at least one fluorescence dye, or at least one fluorescent biomarker;

generating at least one second digital image of the same tissue slide, wherein the tissue slide is stained with a second histochemical dye, said second histochemical dye is H&E;

annotating the at least one second digital image of the tissue slide by layering the at least one first digital image and the at least one second digital image over another; and providing the annotated images to the machine learning module and training the identification model using different morphological features of the pathological anomalies to obtain the classifier, wherein said tissue slide is stained with multiple fluorescent dyes which emit light at different wavelengths; and wherein the digital pathology image analyzing module is configured to analyze the multiple fluorescent dyes on the same tissue slide.

35. The system according to claim 34, wherein the identification model comprises a classifier to classify the abnormal image pattern in accordance with at least two classes; and a determining module for determining whether the abnormal image pattern corresponds to a pathological anomaly based on the classification.

36. The system according to claim 34, further comprising an identification model providing module, wherein the identification model providing module comprises a training module for training a machine learning algorithm based at a plurality of annotated digital pathology images.

37. The system according to claim 34, further comprising:

a user interface comprising:

an input module for providing a digital pathology image to the system; and an output module for displaying detected pathological anomalies in the digital pathology image.

* * * * *